H. E. FOURCHER.
HAND COTTON PICKER.
APPLICATION FILED JULY 3, 1908.
923,638.
Patented June 1, 1909.
2 SHEETS—SHEET 1.
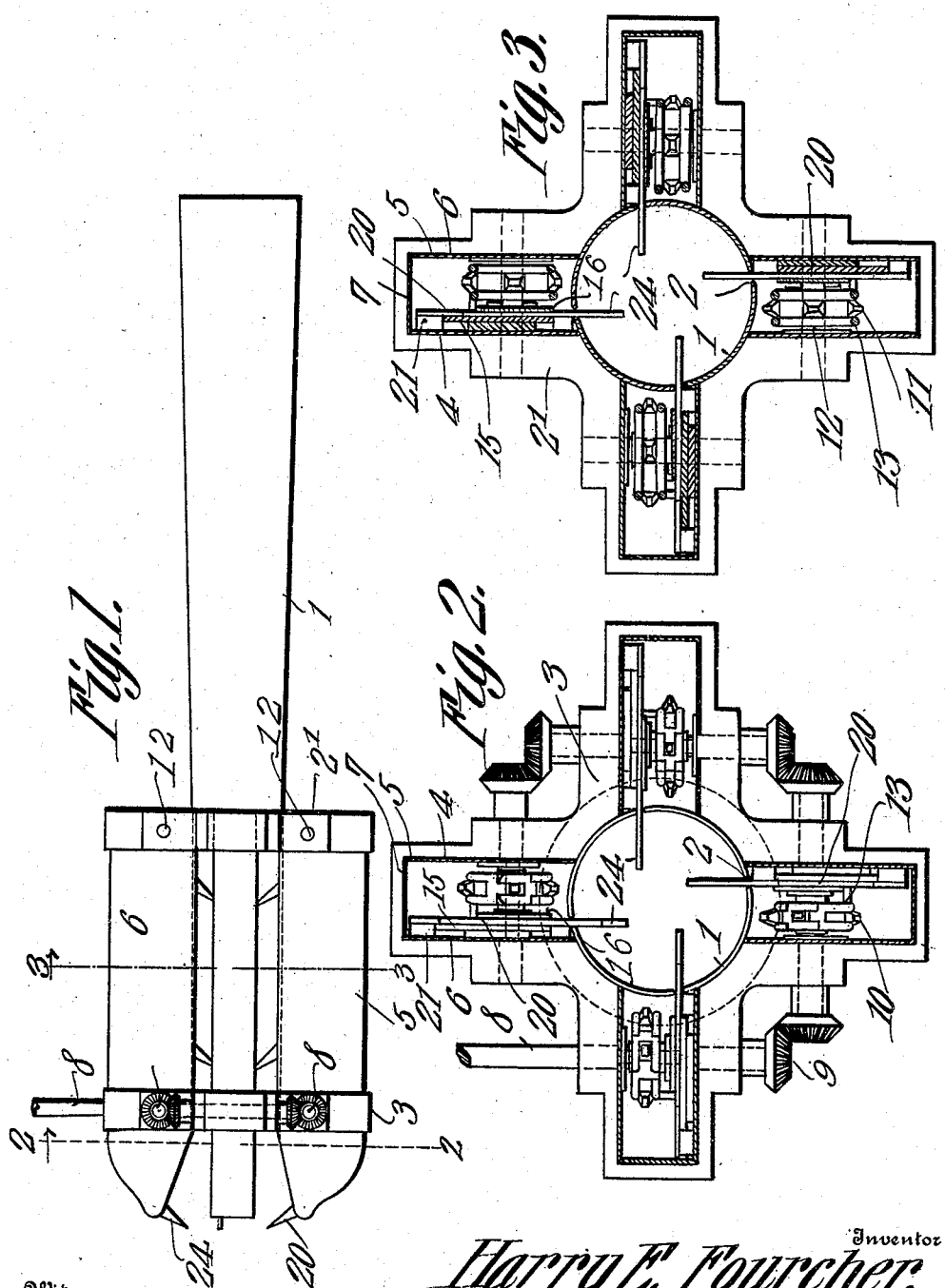
Witnesses
Inventor
Harry E. Fourcher.
By C.A. Snow & Co.
Attorneys H. E. FOURCHER.
HAND COTTON PICKER.
APPLICATION FILED JULY 3, 1908.
923,638.
Patented June 1, 1909.
2 SHEETS—SHEET 2.
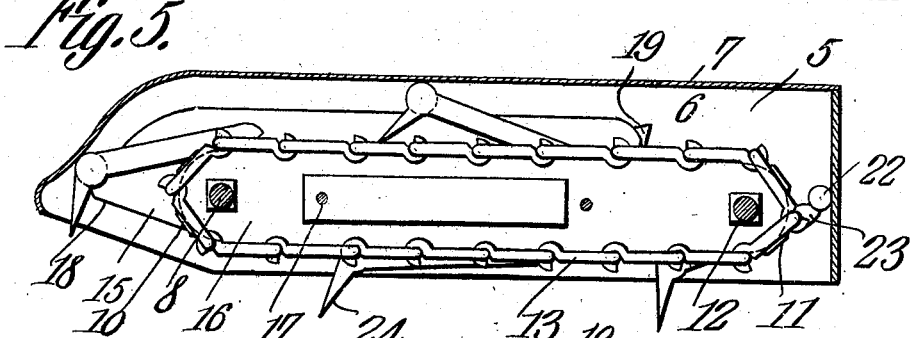
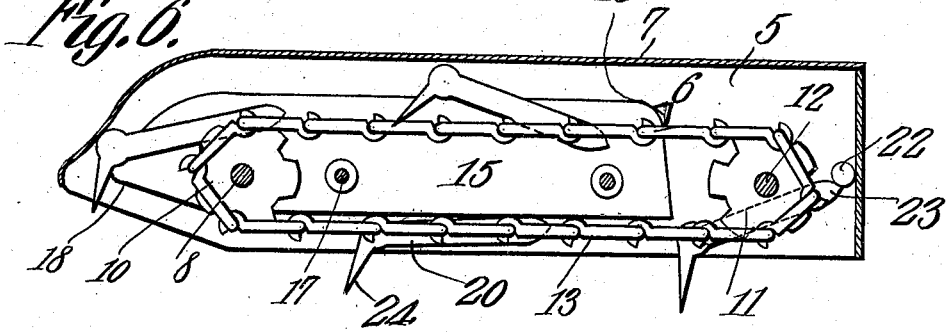
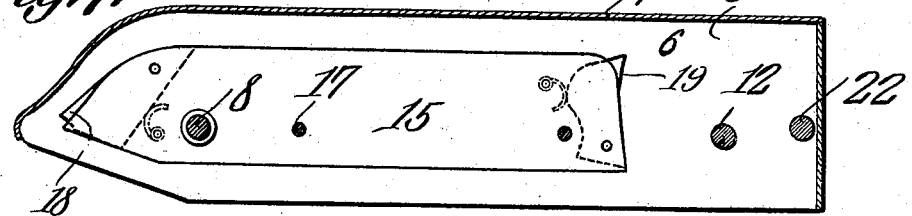
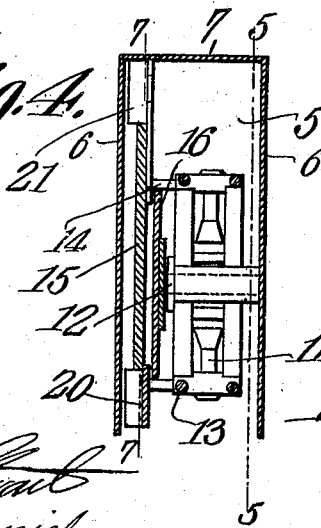
Inventor
Harry E. Fourcher.
By C. A. Snow & Co.
Attorneys
Witnesses

UNITED STATES PATENT OFFICE.

HARRY E. FOURCHER, OF AUGUSTA, GEORGIA.

HAND COTTON-PICKER.

No. 923,638.     Specification of Letters Patent.     Patented June 1, 1909.

Application filed July 3, 1908. Serial No. 441,872.

*To all whom it may concern:*

Be it known that I, HARRY E. FOURCHER, a citizen of the United States, residing at Augusta, in the county of Richmond and State of Georgia, have invented a new and useful Hand Cotton-Picker, of which the following is a specification.

This invention has relation to hand cotton pickers and it consists in the novel construction and arrangement of its parts as hereinafter shown and described.

The object of the invention is to provide a cotton picker which may be manually directed toward the cotton bolls and which is provided with several series of picking fingers which are adapted to coöperate with each other in removing the bolls from the plants and convey them to a tube handle with which the device is provided. Any suitable means may be provided for operating the picker and from the tube handle the staple is delivered to suitable receptacles provided for the reception of the same. The pickers consist of a series of endless belts or chains moving in orbits around sprocket wheels. Picking fingers are mounted upon said belts or chains and are provided with pointed ends which are adapted to engage the lint of the bolls and remove the same from the plant. The cotton picking devices are mounted at the end of the aforementioned tube and the said fingers are adapted to operate through slots provided in the end portion of the tube. The fingers do not operate diametrically opposite each other within the tube but operate in parallel planes transversely across the tube so that the center of the tube is left unobstructed and is free to permit of the passage of the cotton bolls without having the pickers interfere with the seed of the bolls or in other words the picking fingers are so arranged that the seeds are not liable to become clogged in the fingers and thereby interfere with the proper operation of the picking device.

In the accompanying drawings, Figure 1 is a side elevation of one end portion of the cotton picking device. Fig. 2 is a transverse sectional view of the same cut on the line 2—2 of Fig. 1. Fig. 3 is a transverse sectional view of the same cut on the line 3—3 of Fig. 1. Fig. 4 is a transverse sectional view of one of the cotton picking devices mounted upon the end portion of the tube. Fig. 5 is a longitudinal sectional view of the cotton picking device cut on the line 5—5 of Fig. 4. Fig. 6 is a longitudinal sectional view of one of the cotton picking devices cut on the line 5—5 of Fig. 4, but with a plate (16) removed. Fig. 7 is a longitudinal sectional view of one of the cotton picking devices cut on the line 7—7 of Fig. 4 and Fig. 8 is a perspective view of one of the cotton picking fingers detached.

The cotton picker consists of the tube 1 which is slightly constricted toward its receiving end and is provided at its receiving end portion with the slots 2. The brackets 2' and 3 are mounted upon the receiving end of the tube 1 and the said brackets are provided with alined recesses 4. The casings 5 are located in the recesses 4 of the said brackets and the cotton picking mechanisms hereinafter to be described are mounted within the said casings 5. As the said casings and their contents are alike a description of one will answer for all. Each casing consists of the lateral parallel sides 6 and the upper side 7. The shafts 8 are journaled for rotation in the forward end portions of the said casings and are operatively connected with each other by means of the beveled pinions 9 located upon their ends. Any suitable means such for instance as a flexible shaft not shown may be provided for driving the initial shaft 8. The said driving means may be driven by an engine or by an electric motor or other prime mover. The sprocket wheels 10 are mounted upon the shafts 8 and the sprocket wheels 11 are mounted upon the shafts 12 which are located near the inner or rear ends of the casing 5. The sprocket chains 13 pass around the sprocket wheels 10 and 11 and are provided at intervals with the laterally disposed pins 14. The guiding plate 15 is located between the sides 6 of the casing 5 and the bracing plate 16 is also located between the sides 6 of the casing 5 and extends from a point beyond the shaft 8 to a point beyond the shaft 12. The said plates are held in parallel position by the cross bolts 17 in addition to the support afforded by the shafts 8 and 12. The spring actuated plate 18 is pivotally attached to the pointed end portion of the plate 15 and the spring actuated plate 19 is pivotally attached to the blunt end portion of the plate 15. The said plates 18 and 19 have end portions which normally lie beyond the edge of the plate 15. The picking fingers 20 are pivotally mounted upon the pins 14 and are provided with the laterally disposed bosses 21 which are adapted to operate against the edges of the guiding plate 15. The fingers 20 move in a plane between the plates 15 and 16. The transversely disposed stop 22 is located at the inner or rear end of the casing 5 and is in the path of movement of the pointed end 23 of the picking fingers 20. The opposite end portions 24 of the said picking fingers 20 are angularly disposed with relation to the body portion of the said fingers and are adapted to project down through the slots 2 provided in the constricted end portions of the tube 1.

As shown in Fig. 2 of the drawings the pointed ends 24 of the picking fingers 20 are not diametrically disposed with relation to the tube 1 but are in tangential relation to a circle struck from the center of the said tube.

The operation of the cotton picker is as follows: The shafts 8 are set in rotation by means above explained applied to the initial shaft of the said series and as the said shafts rotate they carry around with them the sprocket wheels 10. The said wheels 10 in turn move the chains 13 in orbits around the wheels 11 and the said chains carry around the picking fingers 20. As the said fingers 20 approach the forward ends of the casing 5 they pass down along the upper side of the plates 15 and project beyond the lower edges of the sides 6 of the casings 5 and come in contact with the cotton bolls which are borne by the plants. The said fingers then move toward the wheels 11 and remove the cotton bolls from the plants and carry them along and into the slotted end portion of the tube 1. As the fingers 20 successively arrive at the inner or rear ends of the casings 5 the pointed ends 23 of the said fingers come in contact with the stops 22 and the said fingers are lifted laterally with relation to the tube 1 and the pointed ends 24 of the said fingers are carried up into the casings 5 and are removed from the cotton bolls which are forced by succeeding bolls into the body portion of the tube 1. During the movement of the picking fingers 20 from the outer or forward ends of the casings 5 toward the inner or rear ends thereof, the bosses 21 have contact with the under edge of the plates 15 and when the pointed ends 23 of the said fingers strike or come in contact with the stops 22 the said fingers are caused to move upon the pivot pins 14 so that the pointed ends 24 are moved into the upper or outer portions of the casings 5 and the bosses 21 are placed upon the upper edges of the plates 15. Thus the pointed ends 24 of the fingers move toward each other at the outer or forward ends of the casings 5 and move away from each other at the inner or rear ends of said casings and the said fingers move substantially parallel with each other while passing along the under sides of the plates 15.

Thus the cotton is picked and the bolls are accumulated in the receiving end of the tube 1 and the accumulation of the said bolls forces those bolls which have already been picked along the interior of the tube 1 from whence they may fall into suitable receptacles which have been provided for their reception. By reason of the fact that the teeth 24 are not diametrically disposed with relation to the receiving end of the tube 1 but are tangentially disposed with relation to a circle struck from the center of the said tube sufficient space is provided for the passage of the cotton seed without causing the same to interfere or choke against the teeth or fingers 24.

Also by reason of the fact that the spring actuated plates 18 and 19 are pivotally mounted upon the plate 15 the bosses 21 of the fingers 20 may pass or ride over the projecting ends of the said plates 18 and 19 and depress the same against the tension of their springs when the said fingers are moving in the proper direction to pick the cotton but the said projecting ends of the plates 18 and 19 serve as checks to prevent the fingers 20 from having a tendency to move in the opposite direction.

Having described my invention what I claim as new and desire to secure by Letters Patent is:—

1. In a cotton picker, a tube, a casing mounted upon the tube, a guiding plate located within the casing, a rotating shaft transversely disposed within the casing, sprocket wheels located within the casing one of them being upon said shaft, a sprocket chain passing around the sprocket wheels, said chain having at intervals laterally disposed pins, picking fingers pivotally mounted upon said pins and having pointed picking ends and laterally disposed bosses adapted to operate upon the edges of the guiding plate.

2. In a cotton picker, a tube, a casing mounted upon the tube, a guiding plate located within the casing, an actuating shaft transversely disposed with relation to the casing, sprocket wheels located within the casing one of them being fixed to said actuating shaft, a sprocket chain passing around said sprocket wheels and having at intervals laterally disposed pins, picking fingers pivotally mounted upon said pins and having pointed picking ends and laterally disposed bosses, a stop located within the casing and in the path of the ends of the picking fingers, said bosses being adapted to operate against the edges of the guiding plate during the movement of the chain.

3. A cotton picker comprising a tube, a casing mounted thereon, a guiding plate located within the casing, an actuating shaft transversely disposed in the casing, sprocket wheels located in the casing one wheel being mounted upon said shaft, a sprocket chain passing around the sprocket wheels and having at intervals laterally disposed pins, picking fingers pivotally mounted upon said pins and having pointed work engaging ends and pointed opposite ends with intermediate bosses, a stop located within the casing in the path of movement of the pointed ends of the fingers opposite to the work engaging ends thereof, the bosses of said pins being adapted to engage the edge of the guiding plate during the movement of said chain.

In testimony that I claim the foregoing as my own, I have hereto affixed my signature in the presence of two witnesses.

HARRY E. FOURCHER.

Witnesses:
A. M. PRAGER,
W. T. BRITTON.